(12) United States Patent
Takagi

(10) Patent No.: US 6,490,498 B1
(45) Date of Patent: Dec. 3, 2002

(54) INTEGRATED SUPPORT SYSTEM FOR SUPPORTING SHEET METAL MACHINING

(75) Inventor: Toshio Takagi, Kanagawa (JP)

(73) Assignee: Amada Company, Limited, Kanagawa-ken (JP)

( * ) Notice: Subject to any disclaimer, the term of this patent is extended or adjusted under 35 U.S.C. 154(b) by 0 days.

(21) Appl. No.: 09/110,459

(22) Filed: Jul. 7, 1998

(30) Foreign Application Priority Data

Jun. 5, 1998 (JP) .......................................... 10-157925

(51) Int. Cl.[7] .............................................. G06F 19/00
(52) U.S. Cl. ...................... 700/159; 707/104; 700/160; 700/118; 700/181
(58) Field of Search ................................. 700/159, 160, 700/181, 118; 364/468, 474; 707/104; 345/355, 419, 420, 418; 29/87.1; 382/154

(56) References Cited

U.S. PATENT DOCUMENTS

| | | | |
|---|---|---|---|
| 4,747,153 A | | 5/1988 | Kouno et al. |
| 5,231,675 A | * | 7/1993 | Sarr et al. .................... 382/152 |
| 5,864,482 A | * | 1/1999 | Hazama et al. ........ 364/468.01 |
| 5,971,589 A | * | 10/1999 | Hazama et al. ........ 364/472.01 |
| 6,065,857 A | * | 5/2000 | Hazama et al. ........ 364/468.01 |

* cited by examiner

Primary Examiner—James P. Trammell
Assistant Examiner—Firmin Backer
(74) Attorney, Agent, or Firm—Greenblum & Bernstein, P.L.C.

(57) ABSTRACT

This invention provides an integrated support system for supporting sheet metal machining adapted to store and reuse the know how of skilled machine operators and improve the quality of sheet metal products and the rate of operation of machine tools by shifting the arrangement operation from the actual machining phase to the design phase. An integrated support system for supporting sheet metal machining according to the invention is adapted to collect actual machining information obtained during the actual machining process on the machining site and site-specific attribute information that provide the basis for actual machining data and feed back the collected actual machining information and the site-specific attribute information to a sheet metal machining data storing means containing machining information for controlling the machine tools and machining support information relating to the machining information. An integrated support system for supporting sheet metal machining according to the invention verifies the profile of the product to be machined and/or the machining sequence in advance on the design site and stores the sheet metal machining information obtained by the verification in the sheet metal machining data storing means.

50 Claims, 11 Drawing Sheets

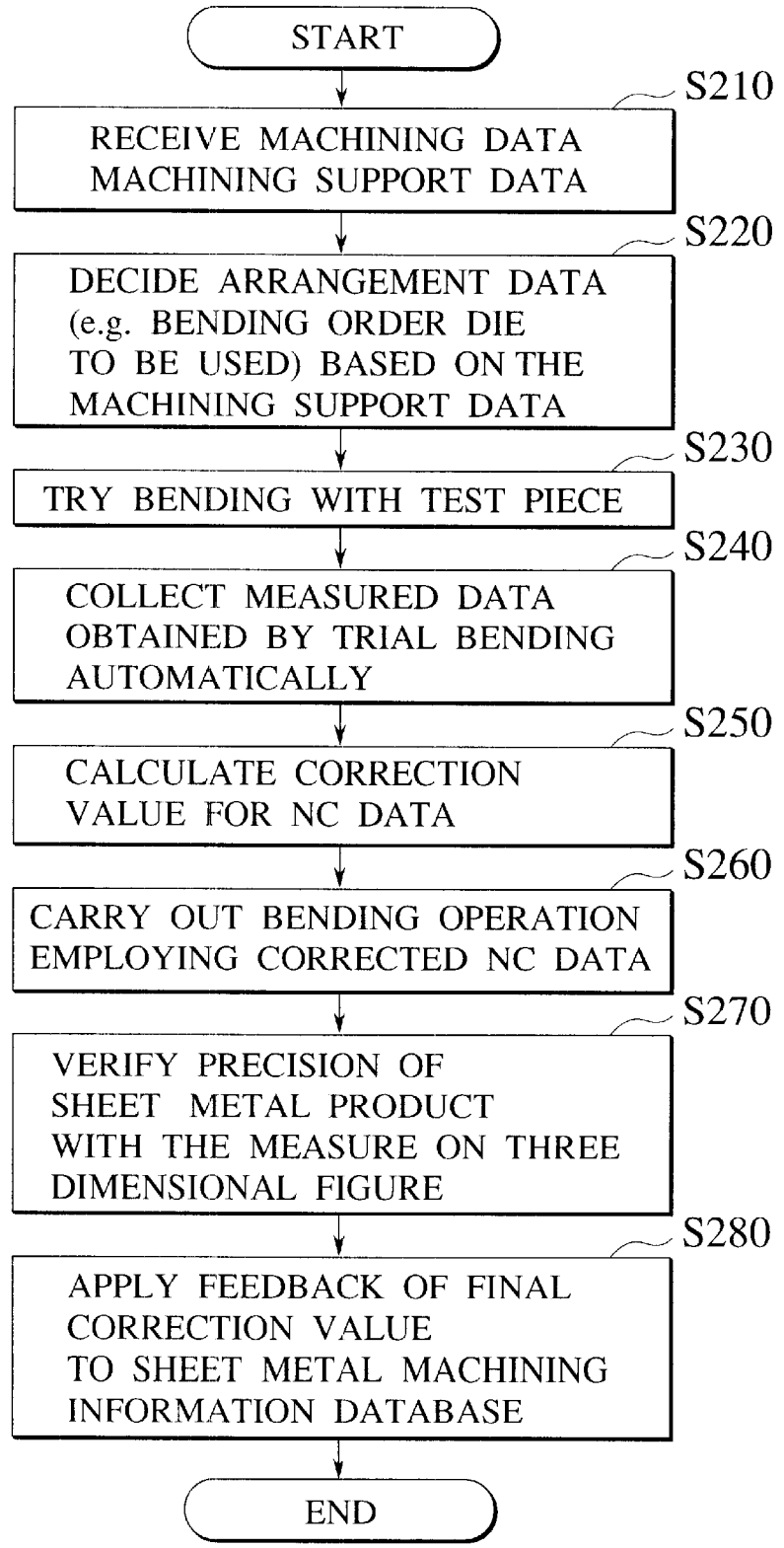

INTEGRATED SUPPORT SYSTEM FOR SUPPORTING SHEET METAL MACHINING

BACKGROUND OF THE INVENTION

1. Field of the Invention

This invention relates to an integrated support system for supporting sheet metal machining. More particularly, it relates to a sheet metal machining information system adapted to centrally collecting, and reutilizing sheet metal machining data fed back from the shop floor in order to efficiently accumulate and exploit the know-how of skilled operators and simultaneously to shift the operation of arrangements from the actual machining phase to the design phase to improve the quality of sheet metal products and the rate of operation of machine tools.

2. Description of the Related Art

Generally, the sheet metal machining is a two-phased process including a design phase that utilizes CAE (computer aided engineering) in the office and an actual machining phase on the shop floor. The office is provided with CAE equipment (also referred to as automatic programming unit) having CAD/CAM functions, whereas the shop floor is equipped with various machine tools for producing sheet metal products including those for punching, laser machining and bending objects to be machined (hereinafter "works"). The machine tools are controlled by NC data, (i.e., machining programs for controlling the machine tools) prepared in the office by means of the CAE equipment. The CAE equipment and the control terminals of the machine tools are connected with each other by way of private lines.

Now, the conventional procedure of sheet metal machining will be summarily discussed below.

Firstly, the design phase procedure in a manner as described below in terms of reception of a new order.

To begin with, in the design phase, a three faces design drawing is prepared for the ordered product. And the data on the three faces design drawing (FIG. 1(A)) and machining are entered to the CAD equipment. As a result, a development elevation (FIG. 1(B)) is produced to provide reference data for actual machining operations.

More specifically, for preparing a development elevation, the CAD operator has to perform various operations including checking the flanges and other components for interferences, determining the attribute values relating to different machining operations including bending and judging if each of the operations is feasible or not, with confirming the values of the important dimensions in the three face design drawing and with imagining a three-dimensional form of the product on the basis of the drawing. The operation of preparing a development elevation is often referred to as brain development for good reason. Then, pictures will be synthetically produced for the different faces of the product, employing the brain development.

Attribute values will be determined for various different machining operations including bending operations in the synthesizing process. Of the attribute values for the machining operations, the stretch of the work due to a bending operation is typically determined by referring to a table of stretch data stored in the office or the data provided by skilled operators. The bending-related attributes may include the stretch and the angle, the lines and the profiles of the ridges and recesses produced at and around each of the bends of the work.

Then, the CAM apparatus (also referred to as automatic programming unit) assigns arrangement data for producing the product to the development elevation prepared in CAD equipment including data for allocating machine tools and outputs NC data including G codes for controlling the allocated machine tools in the form of perforated tapes. Thus, the NC data prepared in the design phase are selected and finalized on the basis of predetermined standard data and by referring to the data provided by skilled operators. Then comes the machining phase.

Only the NC data including the three faces design drawing and the tapes prepared in the design phase for the sheet metal product are provided for the machining phase along with an letter of machining instruction because the data on the development elevation produced in the design phase are poorly accurate and reliable. Thus, the data on the development elevation are not utilized in the machining phase, so that its not provided for machining site.

In the machining phase, a punching and laser machining step comes first. Arrangements have to be made for the machining phase before actual machining operation. The operation of making arrangements is divided into two major stages. In the first stage of arrangement, the NC tapes are entered and dies are selected and arranged in position, while clamps are aligned and other operations necessary for starting the machining process are performed, the first stage of arrangement is setting operation. In the second stage of arrangement, the NC data produced by the design phase are checked for verification and, if necessary, some of them may have to be modified to meet the requirements specific to the shop floor.

The operation of checking and verifying the NC data is conventionally conducted in an NCT (numerically controlled turret punch press) step (for punching and laser machining operations as an arrangement). And it is necessary to preliminarily perform a test punching and laser machining operation for the verification stage because no data on the development elevation are provided.

After the test punching and laser machining operation, a skilled operator typically performs a series of operations for verifying the NC data including laying a blank (produced by cutting a sheet or a rod of the material to given dimensions so that it may be used for the subsequent operations including bending) on a base sheet (work sheet) and testing if the three faces design drawing can be used to successfully produce a development elevation, using the three faces design drawing and the blank, by way of brain development as in the case of the design phase. Data including the stretch of the work due to a three-dimensional bending operation may have to be appropriately taken into consideration to precisely specify the right spots for piercing. Thus, the provided data have to be verified for the NCT/laser machining step. In other words, with a conventional system, the operation of verifying the data on the development elevation has to be repeated in the machining phase in order to prevent defective development (i.e., a situation where a final product having a desired profile is not obtained).

It is also necessary to make arrangements for a bending operation. More specifically, a skilled operator typically performs a series of operations for verifying the data on the development elevation again by way of brain development, referring to the three faces design drawing on the basis of a three-dimensional image he or she has in the brain and taking the bending sequence into consideration. The arrangements will be finalized by the skilled operator for the bending order (i.e., bending sequence), the selection of the die to be used for bending and other bending-related operations according to the result of the brain development.

A set of bending-related attributes such as stretch will also have be determined as part of arrangement information. The stretch of a work has to be determined by carefully taking complex factors into consideration, including the wear, the warp and the rate of spring back of the dies on the shop floor. Thus, the bending-related attributes have conventionally been determined on the basis of the know-how of the skilled operators on the shop floor. Then, the parameters such as the L-value and the D-value of the NC data to be used for bending operations are modified, if necessary, to define data for the positional relationship between each die and the work to be machined on the basis of the bending-related attributes and the arrangement data. As used herein, the L-value refers to the distance to be moved for abutment from the center of the die and the D-value refers to the displacement of the die necessary for the bending the work after the work and the die are brought to contact with each other.

The operators on the shop floor then carry out a bending test and other operations and input corrective data through the control terminal of the bending machine to correct the NC data provided by the design site. The corrected NC data are used for actual machining operations on the floor.

As pointed out above, the arrangement data including the selection of dies and the bending order and the bending-related attributes including the stretch of the works are determined on the shop floor on the basis of not only the standard and general attribute values used for the design phase but also the values of the attributes relating to the machine tools and the dies to be used for machining on the floor and other attributes on the site that are specific to the environment of the floor. Then, these values are used to finalize the NC data.

Particularly, in the case of bending a work, the necessary level of precision of punch bending and other bending operations cannot be secured simply by relying on the attribute values (including those for bending) used in the design phase.

Differently stated, the level of machining precision has been maintained and improved by relying on the know-how of skilled operators who are well versed in the conditions of the machine tools and other elements of the shop floor. And the NC data provided by the design phase are modified and finalized by the know-how of skilled operators.

Additionally, the brain development on the shop floor requires the machine tools on the floor to temporarily become down. In other words, the brain development is referred to as intra-operation arrangement and takes a major part of the down time of the machine tools on the shop floor.

At the same time, since the brain development relies solely on human resources, it is inevitably accompanied by potential human errors (e.g., careless errors). Therefore the brain development causes defective development (defective NC machining data and a resultant situation where a final product having a desired profile is not obtained).

Furthermore, the modified and corrected NC machining data are used only for the current machining operations and no means have been provided to store the data. Therefore, if there is an order for a product identical with a past product (hereinafter referred to as repeater), the NC machining data used for the past product are no longer available. The same brain development procedures have to be followed to produce the repeater.

Thus, in short, the above described conventional procedures for sheet metal machining are accompanied by the problems as summarized below.

As pointed out above, the quality of the sheet metal product obtained by sheet metal machining heavily depends on the condition of the machine tools, the environment of the machining operations and other factors on the shop floor especially in sheet metal machining. In other words, reliable data for precision machining cannot be obtained solely from standard attribute values and predicted attribute values acquired by simulation. This is particularly remarkable in the case of bending. Thus, it is absolutely necessary to take the attributes specific to the site of machining including those of the environment into consideration in addition to the standardized attribute values.

Conventionally, however, the site-specific attributes exist only in the brain of skilled operators as a know-how and are used only for correcting the NC machining data in order to adapt the data to the specific requirements of each machining assignment on the shop floor. In other words, the know-how of skilled operators is utilized only on an ad hoc basis not fed back to the design phase and hence the data used to correct the NC machining data fed from the design phase for the specific machining assignment are simply discarded.

Therefore, the data including the development elevation, the various attribute data and the arrangement data (on the bending sequence and the selection of dies) obtained in the design phase remain as standardized data. Differently stated, the data obtained in the design phase shows discrepancies with the corresponding data obtained on the machining site particularly in terms of the site-specific attributes and hence are poorly reliable.

Machining data (NC data) are prepared in the design phase exclusively on the basis of standardized attributes values and fine adjustments necessary for actual machining operations are carried out solely on the machining site.

What is worse, the shop floor responsible for such adjustments are not provided with data obtained in the design phase. As pointed out above, while a development elevation and other data are prepared in the design phase, they are not at all supplied to the shop floor and hence not available on the shop floor.

The only data the shop floor are provided with are NC data that are raw data for controlling the machine tools on the floor, which are scarce in any sense of the word from the viewpoint of accurately and rigorously controlling the machine tools to produce an intended product. Thus, the stretch and the bending-related attributes are finalized by totally relying on the know-how of skilled operators. The development elevation data and the three-dimensional profile of the product are verified on the shop floor by referring to the three faces design drawing fed from the design phase and the outcome of the machining test conducted on the shop floor only to repeatedly follow the verification procedure used for the brain development in the design phase. Additionally, arrangement information for the bending procedure and the selection of dies has to be finalized, taking the site-specific attributes into consideration.

These verification and arrangement operations on the shop floor requires the machine tools on the floor to temporarily halt (become down). In other words, these operations takes a major part of the intra-operation arrangement time which requires the machine tools on the shop floor to halt, so as to reduce the productivity of sheet metal machining.

Finally, the environment of the sheet metal industry will be briefly summarized below. In recent years, orders comes for an increased number of different products to be supplied in small lots and this tendency raises the time spent for the intra-operation arrangement and the inspection to reduce the efficiency of machining. Additionally, as ISO becomes prevalent, more and more rigorous requirements are posed on the quality to further reduce the efficiency. This means that the above described verification and arrangement operation operate as bottle neck for the improvement of the efficiency of sheet metal machining.

In the CAE environment of conventional sheet metal machining, only the NC data obtained in the design phase are provided from the design office to the shop floor for the machine tools there. On the contrary, the operators on the shop floor are alienated from the flow of information. In other words, the design side (office side) and the machining side (shop floor side) are not coordinated in terms of effectively sharing and exploiting machining and machining-related information.

As summarized above, the first problem of the prior art is that the various operations of brain development solely rely on the know-how of few skilled operators on the shop floor and hence the time spent for the brain development and other intra-operation arrangement takes an increasing part in the total machining time on the shop floor and therefore the down time of the machine tools.

The second problem of the prior art is that the site-specific attributes are not fed back to the design phase for the operation of design and verification, which is therefore conducted solely relying on the brain development based on the predicted data obtained by computation. As a result, various shortcomings arise from the brain development particularly in terms of machining and designing (e.g., defects in the development elevation).

The third problem of the prior art lies in that the know-how of skilled operators on the shop floor is not accumulated and stored for utilization so that same NC machining data may have to be prepared for a number of times to increase the cycle time.

These and other problems operate negatively in terms of the rate of operation of machine tools and the quality of produced sheet metal.

SUMMARY OF THE INVENTION

This invention is intended to solve the above problems that the various steps of sheet metal machining rely on the know-how of few skilled operators and the intra-operation arrangement time has increased as a result of the increase in the work load of the skilled operators and that the know how of skilled operators are used only on an ad hoc basis and not utilized systematically to make it difficult to maintain and improve the quality of machined sheet metal products.

Therefore, it is an object of the present invention to provide a system for feeding the data obtained on the machining phase back to the design phase to accumulate them and inductively improve the accuracy of the sheet metal machining information by means of the know how of skilled operators on the floor.

Another object of the invention is to provide a system for reducing the work load of skilled operators on the floor and improve the rate of operation of machine tools by shifting the operation of making arrangements from the machining side (the shop floor) to the design side (the office).

Still another object of the invention is to provide a network system adapted to establish and grow a database for storing sheet metal machining information including machining support data so that the stored information may be controlled centrally. Such a system is also adapted to incorporate general purpose machines into the network system so that the data relating to each of the machines in the network system may easily be retrieved by and displayed for the machine operators of the system to support the human on the shop floor as well as the operation of precision design (automatic programming).

The inventor of the present invention has focused his research efforts on realizing a system for accumulating and storing the know how of skilled operators on the shop floor relating to site-specific attributes in order to solve the above problems. In other words, the present invention is intended to provide a system for collecting, accumulating, centrally managing and reutilizing pieces of sheet metal machining information (machining data and machining support data) fed back from the shop floor as site-specific machining data and attribute data in order to minimize the discrepancies between the standard attributes applicable to an ideal environment and the site-specific attributes and also minimize the perception gap between the office and the shop floor to realize a two-way communication between them.

According to a first characteristic aspect of the invention, the above objects are achieved by inductively extracting and generating machining data and machining support data from the attributes specific to the actual machining operations on the shop floor, which data are then fed back to the design side.

More specifically (as shown in FIG. 2), according to the first aspect of the invention, there is provided an integrated support system for supporting sheet metal machining by controlling sheet metal machining data including machining data for controlling machine tools and machining support data relating to the machining data, said system comprising:

component 600 that collects actual machining data for the actual machining process on the shop floor and/or site-specific attribute data on which the actual machining data are based and feeds back as sheet metal machining data; and component 700 that stores said sheet metal machining data.

The component 600 (actual machining data collecting section) collects and stores NC data modified and added in the course of actual machining process and site-specific attribute data as they are input by floor operators through control terminals.

The component 600 uses the data obtained in the course of actual machining process to affect the component 700 (sheet metal machining data storing means) in terms of modification or addition.

The information obtained in the course of actual machining process preferably refers to corrected final values.

The component 600 may be so arranged that it automatically reads and collects actual machining data 720 and site-specific attribute data 753 obtained in the course of machining a test piece prior to the actual machining process.

With such an configuration, corrective information can be obtained to modify the machining data to reflect the actual shop floor environment.

As shown in FIG. 2, the component 700 (sheet metal machining information storing means) stores machining data (NC data) 720 for controlling the machine tools and machining support data 750 necessary for generating and verifying machining the data.

The machining support data 750 include graphic data 752 and attribute data 753 and may additionally include multimedia data containing image data and sound data.

As shown in FIG. 3, the attribute data 753 include two regions of a standard attribute section 758 for standard and general attributes and a site-specific attribute section 759 obtained on each shop floor.

These regions store attribute data of five different categories necessary and sufficient for sheet metal machining.

Attribute data of five different categories include material attribute data relating to the works to be machined, machine attribute data relating to the machine tools to be used for machining, die attribute data relating to the dies to be used for machining, machining attribute data relating to the actual machining process and environment attribute data relating environmental factors that can affect the machining operations.

With the above configuration, the know-how of skilled sheet metal machining operators that has been used on an ad hoc basis and not exploited for reutilization is collected as actual machining parameters and site-specific attribute values, which are then fed back to the sheet metal machining information storing means 700.

According to a second characteristic aspect of the invention, the sheet metal machining process is simulated to verify the machining data and the machining support data in advance before the actual machining process on the shop floor.

According to the second aspect of the invention, as shown in FIG. 2 there is provided an integrated support system for supporting sheet metal machining comprising:

a design portion A for generating sheet metal machining data 700 including machining data 720 for controlling machine tools and machining support data 750 relating to the machining data; and machining portion B for performing actual machining operations on the basis of the generated sheet metal machining information 700;

said design portion A including:

component 200 that verifies the profile of the product to be produced by machining and/or the machining sequence on the design site according to the design data and the machining parameters input for the sheet metal product to be produced by machining; wherein said machining data are generated after said verification.

The component 200 (machining simulation component) verifies the profiles of the product to be produced by machining by verifying the input design data and the data on the finished. products (e.g., three-dimensional figure) generated from the design data.

Additionally, the component 200 virtually verifies the machining sequence by forwardly and/or reversely following the actual machining sequence on the CAE equipment, using the data for the finished product.

Such a virtual simulation is preferably conducted by using the attribute data 753 stored in the sheet metal machining information storing means 700.

The method and techniques to be used for the simulation is not limited to the above description.

Preferably, the data on the profile of the product and the data for the finished product include corresponding attribute data added thereto.

With the above configuration, it is possible to provide the shop floor with highly accurate and reliable machining data 720 with related graphic data 752 and attribute data 753.

According to a third characteristic aspect of the invention, an information network is formed to interconnect the machine tools on the shop floor and the design CAE equipment and organize the machine tools of different machining steps by means of the network to make the machining support data available to all of them.

According to the third aspect of the invention, as shown in FIG. 5 there is provided an integrated support system for supporting sheet metal machining comprising:

CAE equipment on the design site;

machine tools 70, 80 on the machining site: and terminal units 30, 40, 50, 60 connected to the respective machine tools; said terminal units 30, 40, 50, 60 and said CAE equipment 10 being interconnected by the network so as to communicate with each other.

The terminal units 30, 40, 50, 60 and the CAE equipment 10 locally or remotely connected to the network can access to the data storing in the sheet metal machining information storing means 700 by way of a server unit 20. The accessible data include machining data 720 and machining support data 750. The machining support data 750 include graphic data 752 and attribute data 753 and may additionally include multimedia data containing image data and sound data.

With the above configuration, it is possible for the machine tools to carry out high precision machining operations by cross referencing the machining support data 750 (e.g., stretch) including machining data 720 and attribute data 753 relating to the respective machine tools.

The above configuration may be adapted to retrieve data from the sheet metal machining information database 700 generated and accumulated on the design site and edit them instantaneously in a manner of easy input method (e.g., bar code reader on the site).

Thus, with the above configuration, the corrected final values produced on the machining site can be fed back on a real time bases so that the design site and the machining site can enjoy two-way communication.

Various further and more specific objects, features and advantages of the invention will appear from the description give below, taken in connection with the accompanying drawings illustrating by way of example a preferred embodiment of the invention.

BRIEF DESCRIPTION OF THE DRAWINGS

FIG. 11 is a flowchart of the algorithm in the actual machining data collecting component for automatically correcting the NC data by using a work test piece.

DETAILED DESCRIPTION OF THE PREFERRED EMBODIMENT

Now, the present invention will be described in greater detail by referring to the accompanying drawings that illustrate a preferred embodiment of integrated support system for supporting a sheet metal machining according to the invention.

Figure 2:
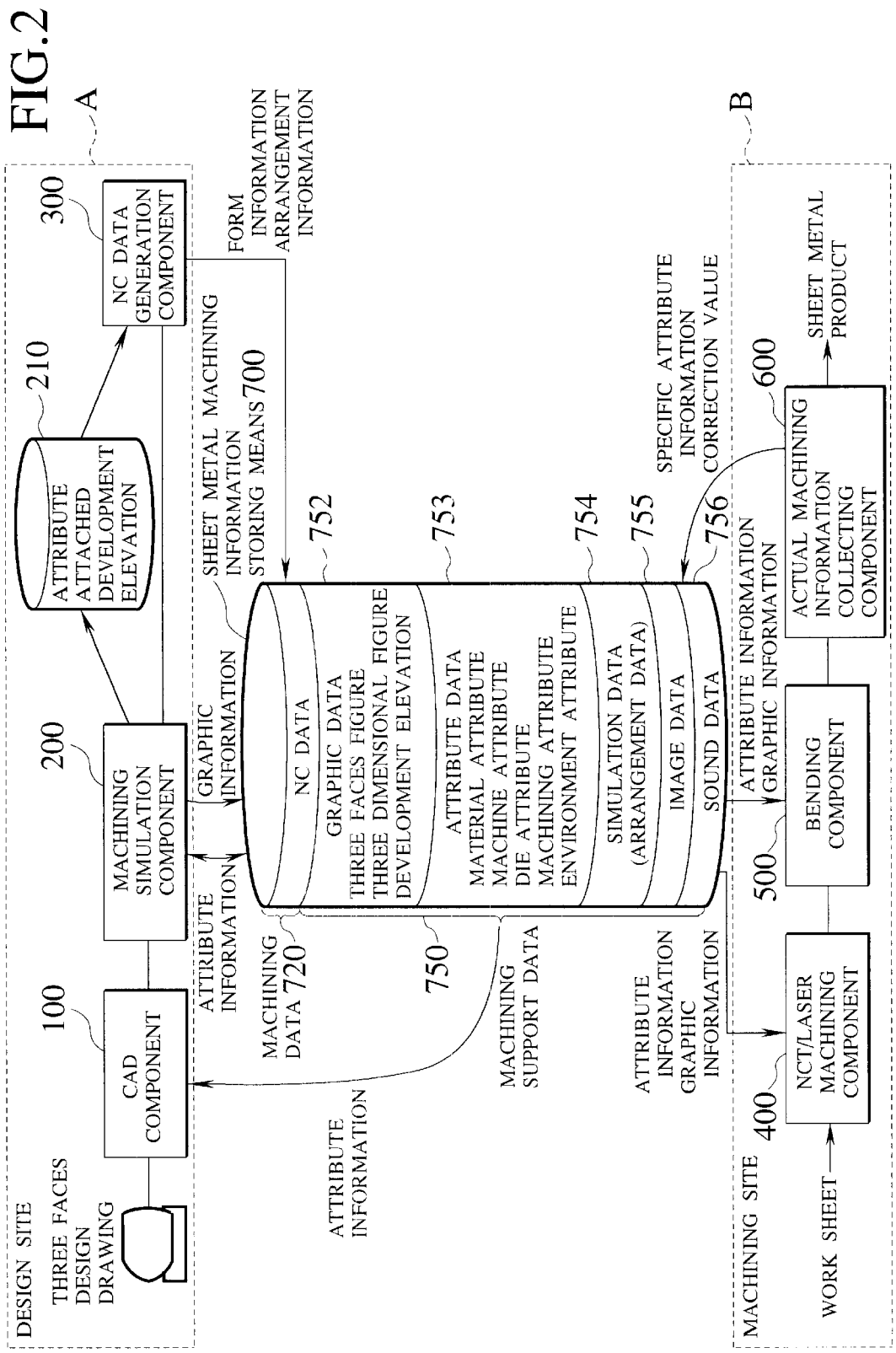
FIG. 2 is a block diagram of the functional configuration of an embodiment of integrated support system for supporting sheet metal machining according to the invention.

FIG. 2 is a block diagram of the functional configuration of an embodiment of integrated support system for supporting sheet metal machining according to the invention. As shown in FIG. 2, the embodiment of integrated support system for supporting sheet metal machining according to the invention is functionally divided into a sheet metal machining information storing means 700, a design site A and a machining site B, the latter two sharing the sheet metal machining information storing means 700.

The design site A comprises a CAD (computer aided design) component 100 that receives three faces design drawings and other design data and produces development elevation data as references for sheet metal machining, a machining simulation component 200 for verifying the development elevation data and the actual machining sequence and an NC data generation component 300 for generating directive information to be given to NC machines including NCT/laser machines and bending machines by using the development elevation data.

On the other hand, the machining site B comprises an NCT/laser machining component 400 for producing blanks by punching and cutting works of metal sheets, a bending component 500 for bending blanks, an actual machining data collecting component 600 for collecting corrected final values and site-specific attributes on the site of actual machining and feeding them back to the sheet metal machining information database 700.

Firstly, the configuration of the design site A of this embodiment will be described by referring to FIG. 2.

On the design site A, the CAD component 100 receives a three faces design drawing that may or may not be drawn on paper for a sheet metal product to be machined for which the order has been received. Then, it generates and outputs a three-dimensional figure and a development elevation corresponding to it.

The machining simulation component 200 virtually verifies whether the development elevation data obtained by the CAD component 100 are correct or not and also the machining sequence for the development elevation (including bending sequence and die selection) on the computer. Thereafter, the machining simulation component 200 outputs optimal development elevation data 210 that can meet the given machining conditions with corresponding attribute data. Note that the operation of verifying the arrangements including the machining sequence is conducted in various ways typically by checking possible mutual interference of machines and works and that of dies and works and by analyzing the machining sequence forwardly and reversely.

The NC data generation component 300 has CAM function, and NC data to be used as machining command control data on the basis of the development elevation data ultimately output from the machining simulation component 200. The generated NC data are stored in the sheet metal machining information database 700 before they are applied to NC machines.

Now, the configuration of the machining site B will be described by referring to FIG. 2.

On the machining site B, the NCT/laser machining component 400 reads from the sheet metal machining information storing means 700 the NC data relating to the part numbers (i.e., type ID) of the specified sheet metal product for NCT/laser machines. Then, the NCT/laser machining component 400 carries out punching and cutting operations on the work sheets to be machined according to the NC data it has read to produce blanks that are to be subjected to bending operations.

The bending component 500 reads from the sheet metal machining information storing means 700 the NC data relating to the bending operation for the specified part numbers (i.e., type ID. Then, the bending component 500 carries out bending operations on the blanks according to the NC data it has read to produce a final sheet metal product having the specified three-dimensional profile.

The actual machining data collecting component 600 collects corrected values and site-specific attributes relating to the NC data on the basis of the values used for the actual machining operations including the bending operations and accumulates the collected data in the sheet metal machining information database 700.

Now, the sheet metal machining information storing means 700 that characterizes the present invention will be described by referring to FIGS. 2 and 3.

The sheet metal machining information storing means 700 centrally stores data relating to sheet metal machining. As shown in FIG. 2, the stored data comprise machining data 720 (NC data) that are directive data to be applied to NC machines for machining operations and machining support data 750 to be used as basis for generating NC data in the design phase and also for supporting machine operators in various machining steps.

Machining data 720 are NC data to be used for controlling NC machines and include standard data generated in the design phase and actual machining data obtained by modifying various dimensional data and angular data in different machining steps. It may be so arranged that the corrected portions of the standard data are updated appropriately by the actual machining data obtained subsequently.

Machining support data 750 include graphic data 752 and attribute data 753. If necessary, they may also include simulation data 754, image data 755 and sound data 756.

Graphic data 752 include three faces design drawing data on the three faces design drawing obtained by two-dimensional projection using the design drawings input to the CAE equipment for the sheet metal product to be machined, development elevation data for a three-dimensional development elevation showing the profile for providing references for machining data, three-dimensional figure data for an image of finished sheet metal product to be produced after the bending operations, face-synthesized drawing data for a face-synthesized drawing synthetically showing the buffed faces of the different sides of the product and other graphic data relating to the sheet metal product to be machined. Note that face-synthesized drawing data are data to be prepared intermediately. Development elevation is, on the other hand, obtained by extracting the outer frames and the bend lines of the product by removing the combined regions of the face-synthesized drawing.

Figure 1A:
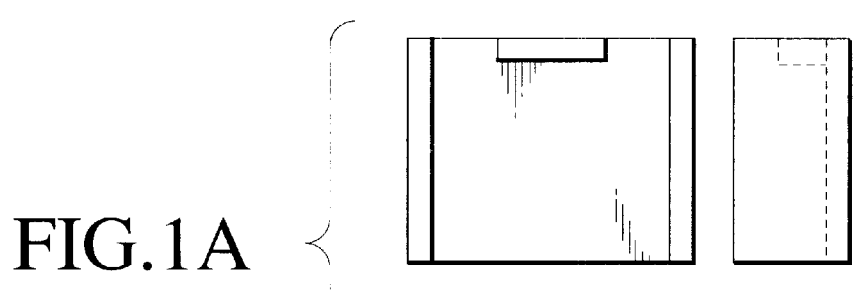
FIGS. 1A, 1B, and 1C are schematic illustrations of graphic data that can be generated and input for sheet metal machining.
Figure 1B:
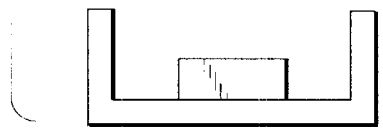
Figure 1C:
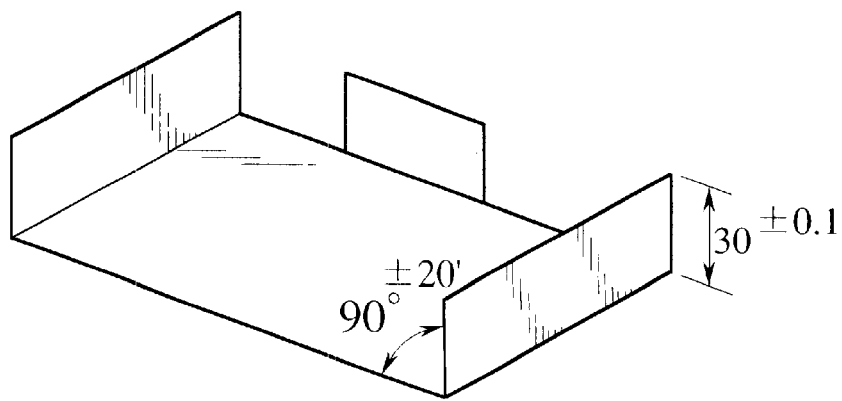

FIG. 1 is a schematic illustration of graphic data that can be generated and input for sheet metal machining. In FIG. 1, (A) shows a three faces design drawing and (B) shows a development elevation, whereas (C) shows a three-dimensional figure.

Simulation data 754 include data relating to the conditions of the various simulations conducted by the machining simulation component 200 and the results of the simulations.

Image data 755 and sound data 756 are part of multimedia data to be input to the actual machining data collecting component 600 as additional data (tip data) for actual machining operations.

Now, the contents of attribute data 753 will be described.

Attribute data 753 contains data for the five major attributes of the material attribute, the machine attribute, the die attribute, the machining attribute and the environment attribute, which will be described below.

(1) Material Attribute

Material attributes refer to data for specifying the work to be machined for an operation in terms of name, material, thickness and the dimensions.

(2) Machine Attribute

Machine attributes refer to data for specifying the machine to be used for an operation in terms of type, name and number.

(3) Die Attribute

Die attributes refer to data for specifying the tools including punches and dies to be used for an operation in terms of profile and angles.

(4) Machining Attribute

Figure 4:
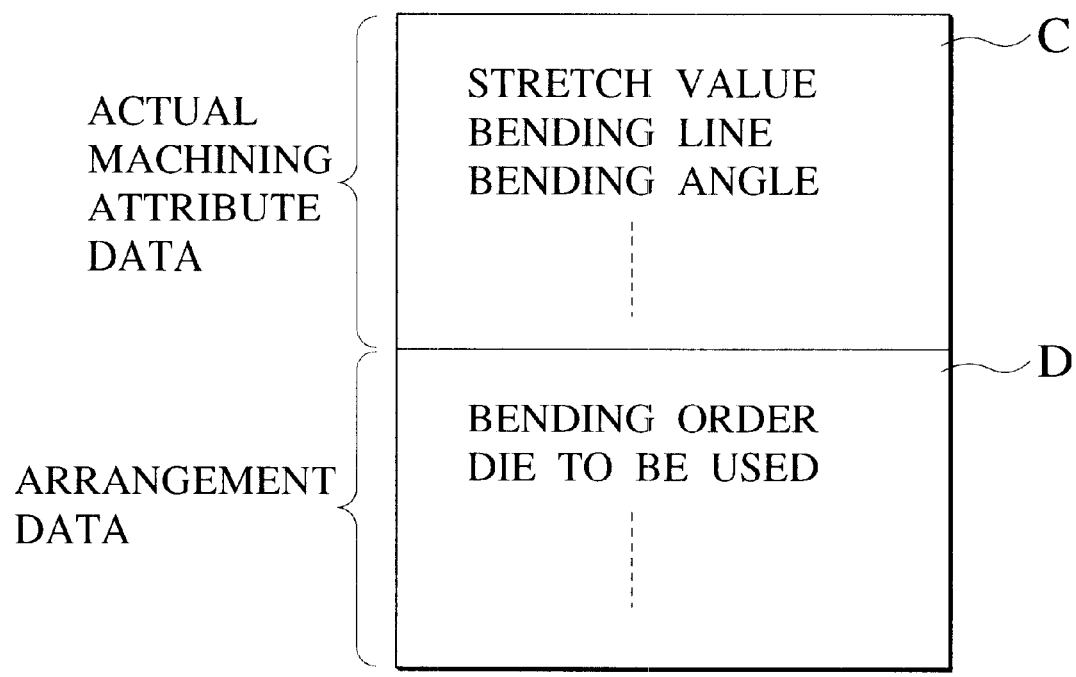
FIG. 4 is a schematic illustration of the example of the data structure of machining attribute data stored in the sheet metal machining data storing means.

Machining attributes refer to actual machining attribute data such as the stretch that appears in the actual machining, the bend lines, the bend angles, the ridges and recesses at and around each of the bends of the work (FIG. 4-(C)) and arrangement data required for the actual machining operation including those for the bending sequence (bending order) and the dies to be used (FIG. 4-(D)). Note that machining attributes are not limited to those listed above. They may include any data that can be obtained directly or indirectly during actual machining operations.

(5) Environment Attribute

The environment attributes refer to data relating to environmental factors such as temperature and humidity that can affect actual machining operations. The temperature and humidity can affect the spring back of bending.

Figure 3:
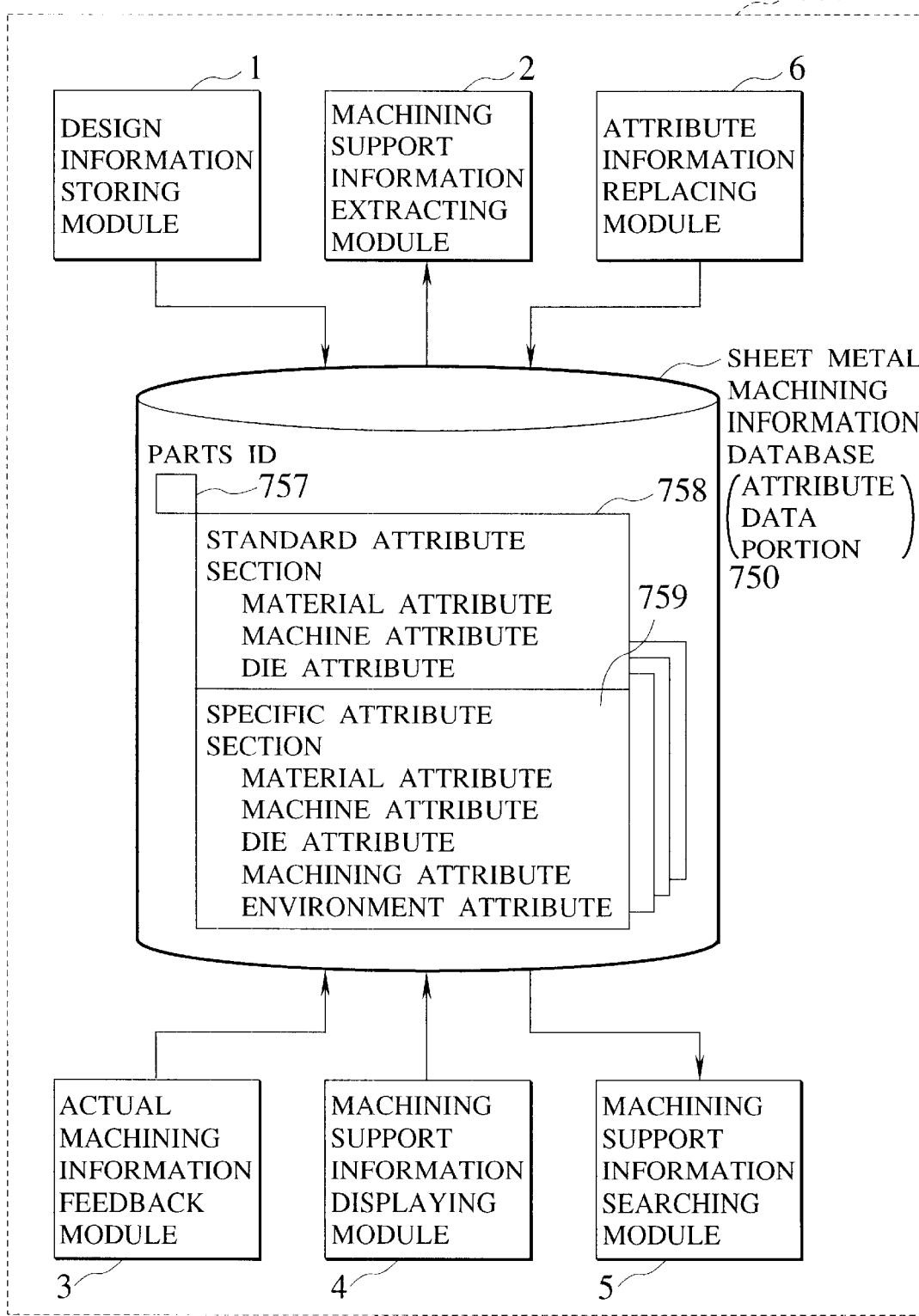
FIG. 3 is a block diagram of the sheet metal machining information storing means, showing the example of the internal data configuration and the access-related function.

FIG. 3 shows an exemplary data structure of the attribute data 753 in the sheet metal machining information storing means 700. As shown in FIG. 3, attribute data 753 are allocated to a standard attribute section 758 and a specific attribute section 759. A total of n (n being in integer including 1) specific attributes correspond to a single standard attribute.

Of the five major attribute, the material attribute, the machine attribute and the die attribute are attributes for which general and standard values can be defined in advance and those values are contained in the standard attribute section 758.

Unlike the standard attribute section 758, the specific attribute section 759 contains specific attribute values that may be different for each machine and tool (die) of each specific machining site. Site-specific attributes are attributes specific to each machining site and reflect the actual machining environment of the site. Site-specific attributes correspond to the know how of skilled operators that will be used for actual machining operations on the site. The specific attribute section 759 contains machining attributes and environment attributes that reflect the actual machining environment in addition to material attributes, machine attributes and die attributes. The machining attributes and environment attributes in the site-specific attributes refer to data for the stretch that appears in the actual machining and those for the bending order and the dies to be used (and may contain correspondence of the dies to bend lines the dies to bend lines). Such machining attribute data and environment attribute data be fed back for the machining data 720 and also for the material attributes, the machine attributes and the metal attributes in the specific attribute section 759.

The data for the specific attribute section 759 are collected during the actual machining process by way of the control terminals connected to the machine tools of the site through the actual machining data collecting component 600. It may be so arranged that only the values used to update the last machining operation are stored in the specific attribute section 759 for the material attributes, machine attributes and die attributes or, alternatively, there may be installed a system that allows optimal attribute values to be retrieved from the stored values depending on the required processing speed and the hardware resource at hand. Still alternatively, it may be so arranged that the standard attribute section 758 stores correction flag (not shown) for indicating if specific attributes are held there for corresponding attributes and attribute data can be updated at a timing different from the timing of collecting site-specific attribute data in the actual machining process.

The attribute data 753 contains as key items and type IDs 757 including part numbers of the sheet metal product to be machined.

Type IDs are assigned to the corresponding records not only for the attribute data 753 but also for the machining support data 750 including the graphic data. 752 and the machining data 720 so that any of these data may be retrieved as related data by using an appropriate type ID 757 as keys. It may be needless to say that any of the items in the sheet metal machining information storing means 700 can be retrieved directly whenever necessary without using key items. Any of the attribute data in the standard attribute section 758 itself may be appropriately updated by the corresponding data in the specific attribute section 759 to customize them for the shop floor.

In short, what is important is that material attribute data, machine attribute data and die attribute data are used as standard attribute data and that material attribute data, machine attribute data, die attribute data, machining attribute data and environment attribute data are stored as site-specific attribute data corresponding to the know how of skilled operators obtained in the actual machining process on the shop floor. The data structure and the data storage system of the database may be modified appropriately without departing from the scope of the invention.

While the sheet metal machining information storing means 700 is preferably configured as a relational database that is flexibly accessible, the configuration of the data base is not limited to the relational database. The sheet metal machining information storing means 700 does not necessarily corresponds to a single database unequivocally. If appropriate, the database may be divided into a master section for containing model data such as model graphic data and standard attribute data and work section for containing site-specific attribute data depending on the access frequency. The arrangement data (FIG. 4-(D)) discussed earlier may be stored in some other specific region (e.g., 754) of the sheet metal machining information storing means 700. Alternatively, the arrangement data generated from attribute data 753 as secondary data may be stored in a different storage means such as another database so that any of them may be retrieved by pointer from the sheet metal machining information storing means 700.

All or part of the contents of the sheet metal machining information storing means 700 are automatically backed up by FDs, CDs and/or some other recording medium. The backup can effectively avoid any down time on the part of the machines if unpredicted circumstances arise as it restores the contents to the proper database.

Now, the function relating to inputting additional data to and outputting data from the machining support data 750 shown in FIG. 3 will be described. This input/output-related function comprises a design data storing module 1, a machining support data extracting module 2, an actual machining data feed back module 3, a machining support data displaying module 4, a machining support data searching means 5 and an attribute data replacing module 6.

The design data storing module 1 can be accessed from the machining simulation component 200. The design data storing module 1 stores the standard attribute data corresponding to the graphic data obtained in the design phase as part of the machining support data 750. The sheet metal machining information database 700 may initially load standard attribute data as standard library.

The machining support data extracting module 2 can be accessed from the machining simulation component 200 on the design site and also from the NCT/laser machining component 400 and the bending component 500 on the machining site. The sheet metal machining extracting module 2 extracts attribute data 753 necessary for the design of the sheet metal product to be machined (to generate machining data) corresponding to the input machining conditions (bending, cutting, etc.). The machining support data extracting module 2 also extracts attribute data necessary for the different machining operations such as the stretch that appears in the actual machining, the bend lines, the bend angles, the ridges and recesses at and around each of the bends of the work and attribute information required for the arrangement for the actual machining operation including those for the bending order and the dies to be used (i.e., arrangement data). The information relating to the machining data (i.e., machining parameters) such as L-value and D-value based on the stretch values generated from the extracted attribute data as secondary data may also be stored in advance in the sheet metal machining information storing means 700 or in a separate work data base in the form of data tables depending on the access frequency.

The actual machining data feed back module 3 can be accessed from the actual machining data collecting component 600. The actual machining data feed back module 3 feeds back the site-specific attribute data obtained in course of the actual machining process to update the attribute data 753 or as additional data to be added to the attribute data 753.

The machining support data displaying module 4 can be called appropriately by each of the components (100 through 600) both on the design site A and the machining site B. The machining support data displaying module 4 can access to the attribute data 753 by way of the machining support data extracting module 2. Then, the machining support data display module 4 displays the attribute data and the arrangement data relating to the sheet metal product being processed obtained by accessing the attribute data 753 along with related display data on the monitor of the control terminal or the operation panel of the CAE equipment and each of the related machines.

The machining support data searching module 5 can be accessed appropriately by each of the components both on the design site A and the machining site B as in the case of the machining support data displaying module 4. The machining support data searching module 5 can access to the attribute data 753 by way of the machining support data extracting module 2 to obtain attribute data that meet the retrieval demand produced by specifying any of the type IDs 757 and the other data items of the attribute data 756. The obtained data are then displayed on each of the related terminals by way of the machining support data displaying module 4.

The attribute data replacing module 6 replaces the data of the standard attribute section 758 entirely or partly with the corresponding data of the specific attribute section 759 according to a data replacement instruction applied from outside.

Note that the modules shown in FIG. 3 may be arranged within the respective components (100 through 600) in FIG. 2. Alternatively, the modules may be arranged outside the components in FIG. 2 to operate as general purpose I/O routines for the sheet metal machining information storing means 700 (machining support data 750). Concrete arrangement of the modules way be altered appropriately.

Now, the hardware configuration of the embodiment will be described by referring to FIG. 5.

Figure 5:
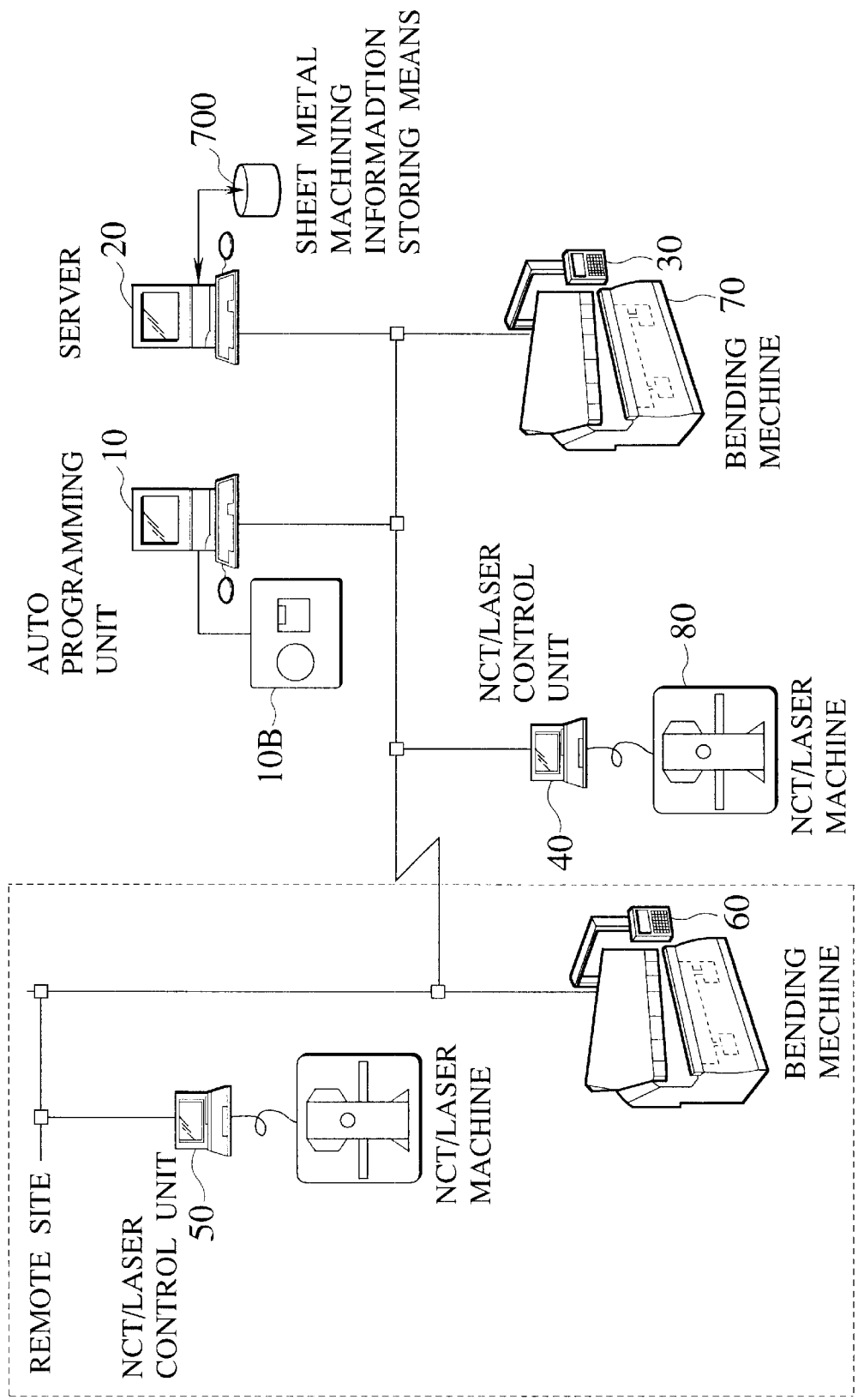
FIG. 5 is a block diagram of the embodiment of integrated support system for supporting sheet metal machining according to the invention.

The CAD component 100, the machining simulation component 200 and the NC data generation component 300 on the design site A are arranged on the CAE equipment 10, which is referred to as automatic programming unit in FIG. 5. Note, however, that the components does not necessarily have to be arranged on the single CAE equipment and, alternatively, may be arranged on a plurality of units of CAE equipment depending on the number of operators, the available space and the efficiency of operation. The sheet metal machining information storing means 700 shown in FIG. 2 is controlled by a server unit 20 shown in FIG. 5. However, the sheet metal machining information storing means 700 does not necessarily have to be located on the hard disc of the server unit 20 and, alternatively, may be arranged on the server unit 20 or distributed among other terminals. Note that, if it is distributed, any access to the data base by a client is transmissive relative to the physical location of the data base and hence the client does not need to be aware of the physical location of the data base. Additionally, the server unit 20 and the CAE equipment 10 may be realized in a same computer. The server unit 20 may be physically arranged at any place and does not need to be located on the design site A.

The NCT/laser machining component 400 shown in FIG. 2 is arranged at an NCT/laser machine 80 and an NCT/laser control terminal 40. Note that NCT machining and laser machining may be performed by different machines or, alternatively, they may be performed by a complex machine adapted for the two types of machining operation.

The bending component 500 in FIG. 2 is arranged in the bending machine 70 in FIG. 5. The bending machine may be provided with a control terminal for displaying machining support data or with an operation panel comprising a monitor screen.

The actual machining data collecting component 600 in FIG. 2 may be realized in the server unit 20 in FIG. 2 or in the control terminal of each of the NC machines when data are collected by relying on the floor operators or it is desirable to send additional data (tip data) for actual machining operations.

Each of the CAE equipment 10, the server unit 20, the control terminals 30, 40 as described above is provided with a network OS adapted to network connection and data communication. While the above units may be connected to a LAN (local area network) by means of, for example, Ethernet or a token ring, the connection of the units is not limited to a LAN and they may be connected remotely by way of various lines and/or radio waves. For example, a sheet metal machining plant may be built in a foreign country and the local operators may attend the machine tools by referring to the instructions (machining data and machining support data) for the machining process, employing the network including remote sites.

The CAE equipment 10, the server unit 20, the control terminals 30, 40 may be realized by means of respective computers, each of which may comprises a CPU, input device such as a keyboard; a mouse; a bar code reader, an external memory device such as a disc and memory, and output devices such as a display unit and a printer. The CPU has an arithmetic unit that performs various processing operations and a main memory for storing instructions and data to be used for processing operations.

The programs for realizing an integrated support system for sheet metal machining centered around a machining support data storing means (database) as described above can be stored in a recording medium such as a memory, a magnetic disc, an optical disc (10B in FIG. 5). Thus, the program and data will be read from the storage device and the program will be executed for the purpose of the invention.

Now, the flow of the processing operation on the design site A and that of the machining site B shown in FIG. 2 will be described by referring to the drawing.

Assume that an order for a new sheet metal product is received and a designing operation is started on the design site.

Figure 7:
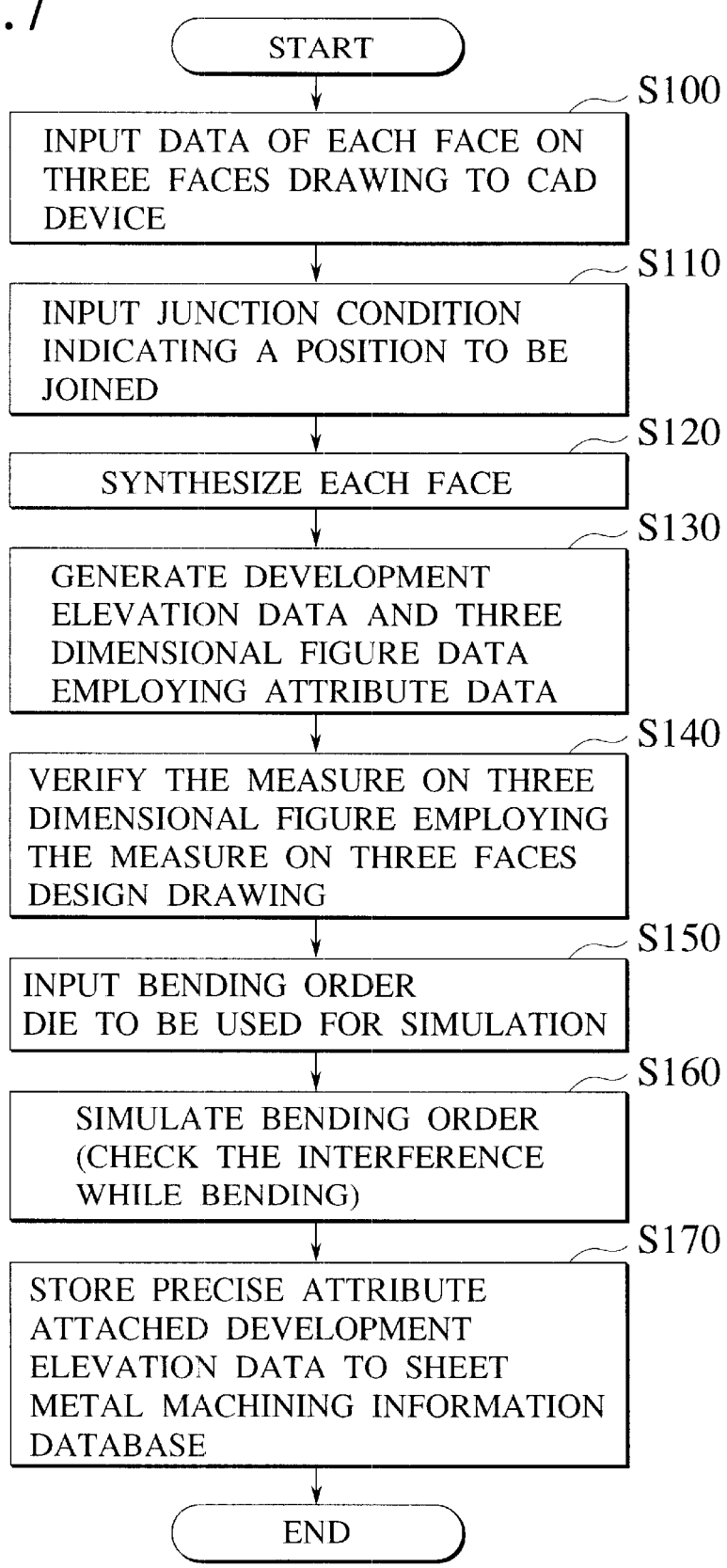
FIG. 7 is a flow chart illustrating algorithm in the CAD component and the machining simulation component of the embodiment of the invention.

Firstly, the operation of preparing a development elevation by the CAD component 100 will be described by referring to FIG. 7.

Figure 8A:
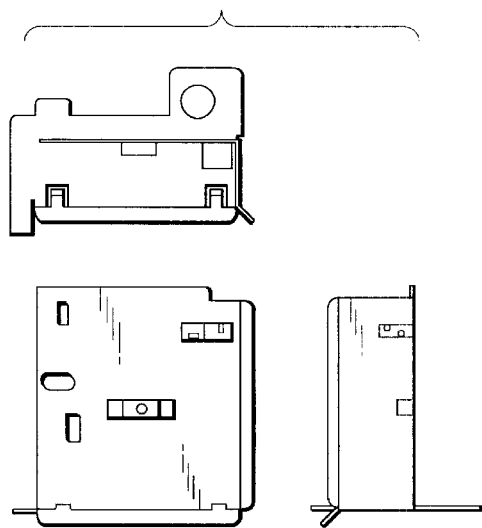
FIGS. 8A, 8B, 8C, and 8D are schematic illustrations showing the process of generating an development elevation and a three-dimensional figure in the embodiment of the invention.

To begin with, data for design drawings including a three faces design drawing (FIG. 8(A)) of the sheet metal product to be machined are input to the CAD component 100 for each face of the product (S100). Then, the machining conditions including bending angles and bending directions are input along with the conditions for the junctions of the faces of the product. Also, the restrictive conditions for the materials are input (S110).

Figure 8C:
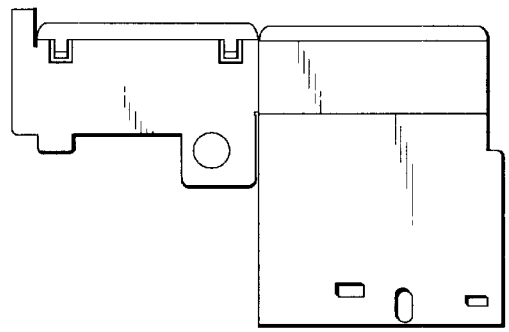
Figure 8B:
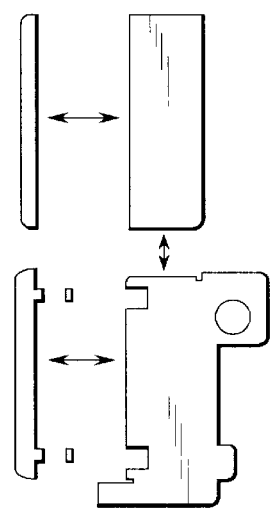
Figure 8D:
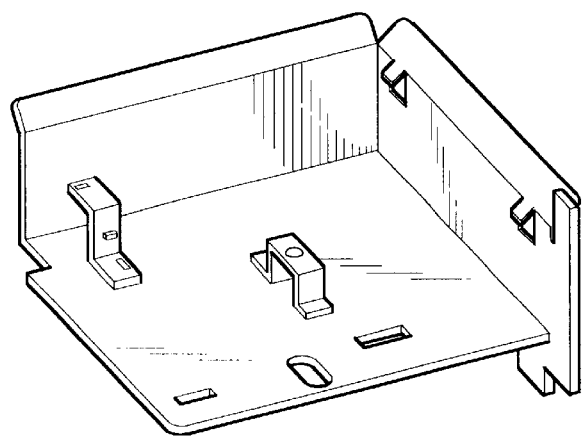

If the attribute data 753 stored in the sheet metal machining data storing means 700 contains data that exactly or approximately meet the input machining conditions, the attribute data that may include stretch data will automatically be read out. The faces of the product are then synthetically formed from the read out attribute data that may include stretch data to produce synthesized drawings for each of the faces (FIG. 8(B)) (S120). Then the faces are made to match each other by means of the synthesized drawings for each of the faces, using the dimensional data (important dimensional data) in the three faces design drawing to generate development elevation data accompanied by standard attribute data (FIG. 8(C)) (S130).

In the case of a new sheet metal product, development elevation data can be prepared by using the standard attribute data stored as general purpose data in advance. If the product resembles to a product that has been produced, the site-specific data (the stretch value, the bending order, the dies to be used, etc.) may also be reflected to the data of the development elevation and the three-dimensional figure data.

If, on the other hand, the attribute data 753 stored in the sheet metal machining data storing means 700 dose not contain data that exactly or approximately meet the input machining conditions, estimated attribute data that may include stretch data are generated from the input machining conditions typically means of finite-element method (FEM) and the generated data are stored in the database as standard attribute data. The generated attribute data are available for reuse.

Along with the preparation of development elevation data, a three dimensional figure (FIG. 8-(D)) of the sheet metal that can be obtained after the bending operation confirming to the bending conditions produced on the basis of the obtained attribute data will be prepared (S130). More specifically, data including bending attributes (the stretch value, the bend lines, the bend angles, the ridges and recesses at and around each of the bends of the work, the inner radius of curvature of each of the bends) and junction conditions (abutting, overlapping, removal of relief holes) are obtained from the attribute data 753 by the operator in response to a retrieval request displayed on the display screen of the CAE equipment 10. Then, a three-dimensional figure is prepared, using the bending attributes and the junction conditions. At the same time, the bending attributes and the junction conditions are displayed on the display screen of the CAE equipment 10 so that the operator can appropriately edit the machining conditions for bending and the junction conditions on the displayed three-dimensional figure to see instantaneously the edited and modified conditions that are reflected to the three-dimensional figure. Additionally, the read attribute data may be used to highlight the interfering portions of the three-dimensional figure in order to draw attention on the part of the operator.

Note that attribute data are added to the three-dimensional figure as in the case of the development elevation. The data for the three-dimensional view (to be used as model for analysis) are normally as those for surface model. The data for the three-dimensional figure expressed in the form of a surface model are accompanied by additional data for the thickness of the sheet metal generated separately from the attribute data that have been read for the material. An image of the finished product like a solid model is produced as the data for the thickness of the sheet metal are processed with the other data. The model for analysis may be prepared as solid. model from the beginning to provide a data structure where the mass property data including the data for the thickness of the sheet metal are contained within the model for analysis. Since a three-dimensional figure provided with various attribute data can be displayed and processed on the screen, less experienced operators can easily and accurately prepare development elevations and three-dimensional figure that have hitherto been prepared by brain development.

Now, various simulations that can be conducted by the machining simulation component 200 in FIG. 2 will be described. With this embodiment, the operation of verifying the profile and the machining arrangement (machining sequence) can be virtually conducted in the design phase on the basis of the three-dimensional figure and the development elevation prepared by the CAD component 100 and provided with attribute data.

(1) Verification of Development Elevation Data

The development elevation is verified from the viewpoint if the profile produced by the development elevation data are correct or not when used as machining references. More specifically, the displayed three-dimensional figure is cross-referenced with the three faces design drawing to check the correctness of the development elevation data in terms of dimensions and profile (S140). At the same time, possible interference of flange sections, overlapping and abutting can be checked appropriately. The verifying operation on the CAE equipment eliminates the inspection for a defective development elevation that used to be performed in the actual machining phase and hence the time for the intra-arrangement that has to be consumed as a result of the examination. The three-dimensional figure can be enlarged or reduced and/or rotated on the display screen of the CAE equipment. Furthermore, as shown in FIG. 1-(C), the dimensions and the angles of any specified part can be displayed on the display screen. While the data on thickness of the sheet metal are omitted in FIG. 1-(C) for the purpose of simplicity, it may be needless to say that such data can be incorporated into the data for three-dimensional display.

(2) Verification of Machining Sequence

The machining sequence is verified firstly by inputting the arrangement data including the bending sequence and the dies to be used for the bending operation (S150). While the arrangement data initially represent the estimated values obtained in the design phase, the estimated arrangement data can also be virtually verified.

Figure 9A:
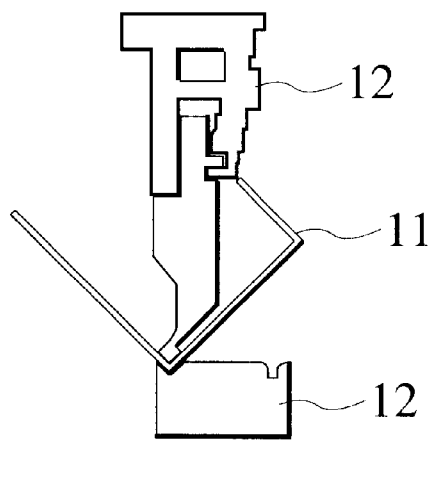
FIGS. 9A, and 9B are schematic illustrations showing a simulation of the machining sequence that can be performed with the embodiment of the invention.
Figure 9B:
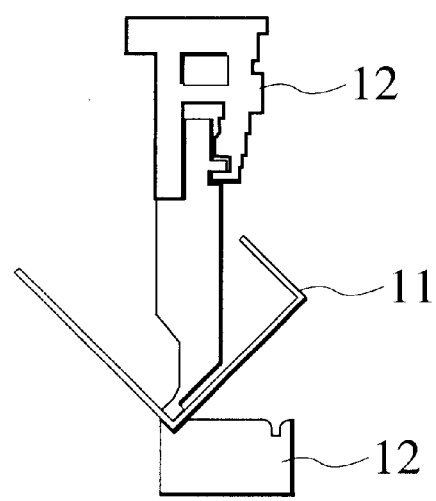
Figure 10:
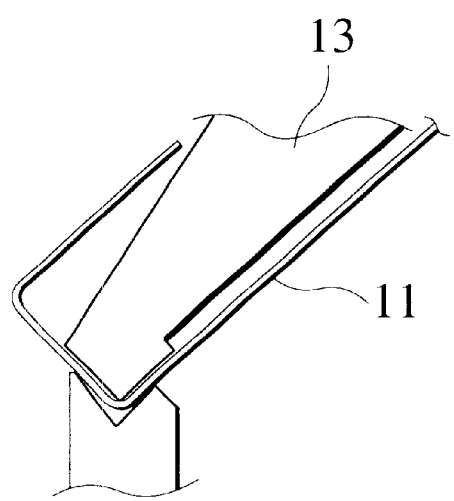
FIG. 10 is a schematic illustration showing a simulation of the machining sequence that can be performed with the embodiment of the invention.

Then, a three-dimensional figure is displayed on the display screen and an operation of reverse simulation for reversely following the bending sequence from the development elevation to the three-dimensional figure and/or that of forward simulation for forwardly following the bending sequence will be carried out(S160). The simulations can be conducted by means of the computer each time when the bending attribute data such as the stretch value and the bending angles obtained from the attribute data 753 and the abutting data are modified. Thus, with the simulations, possible interference of the work 11 and the machine 12 as shown in FIG. 9-(A) and (B) and possible interference of the work 11 and the die 13 and the significant dimensions can be checked and confirmed. The simulations make it possible to determine and verify the attribute data (i.e., arrangement data) necessary for the intra-arrangement including the operation of determining the bending sequence and selecting the dies that used to be performed as brain development on the shop floor and consequently eliminate the intra-arrangement required for determining the attribute data to be used for actual machining.

The development elevation data 210 that have been verified and finalized by the simulations using the attribute data 753 are then stored in the sheet metal machining information storing means 700 along with the machining support data 705 including corresponding attribute data 753 and graphic data 752 (S170).

Finally, the NC data preparing component 300 shown in FIG. 2 produces the layout for the machining operation on the basis of the data of the finalized development elevation 210 provided with attribute data. Then, the NC data generation component 300 generates NC data 720 including a G code and stores them in the sheet metal machining information storing means 700. The NC data 720 are stored with the respective corresponding machining support data 750.

Now, the processing operation on the machining site B will be described.

The machining site B receives instructions including type IDs 757 representing part numbers and data on the complete design by way of the network or a letter of instruction. Then, the control terminal of the NCT/laser machine accesses the server unit 20 and reads the corresponding machining data 720 and machining support data 750 from the sheet metal machining information storing means 700. Thus, contrary to the conventional practice of providing the machining site with NC data for controlling NC machining operations and a letter of instruction separately, directive data, machining data and machining support data are correlated with each other and transmitted to the machining site B on a real time basis with this embodiment.

If the letter of instruction carries printed bar codes representing the type IDs 757, the bar code reader annexed to the control terminal reads the bar codes and transfer instantaneously the corresponding NC data 720 to the control terminal for loading. The letter of instruction may additionally carry thereon a printed three-dimensional figure of the product to be machined.

Then, firstly in the NCT/laser machining step, the machines and the dies to be used for machining are selected and an operation of making an arrangement for alignment is conducted prior to actual machining by referring to the letter of instruction.

Note that the development elevation data have already been verified on the design site A. Therefore, any inspection for secondarily checking a defective development from the three faces design drawing and the development elevation due to brain development is not necessary. Additionally, while the development elevation data and the machining operation for overlapping areas of the product are conventionally verified by way of test machining, using a sample, and the sample blank produced by the test machining is checked by comparing the actually measured values and the corresponding values on the three faces design drawing, such test machining on the machining site is no longer necessary with this embodiment because it has already been performed by the computer. Therefore, the intra-arrangement time will be exclusively used to actually make the machine ready for operation and the time that used to be spent for the verifying operation will be totally eliminated.

Furthermore, prior to the NCT/laser machining, it is possible to display the development elevation data of the product to be machined and the corresponding attribute data on the display screen of the control terminal in an appropriate layout by referring to the machining support data 750. Thus, operators on the shop floor can easily verify and edit the NC data to be used for a machining operation, using the displayed machining support data.

The NCT/laser machining component 400 then performs punching and laser machining operations on the blank according to the NC data transmitted from the server unit or the NC data obtained.by modifying those transmitted from the server unit.

Figure 6:
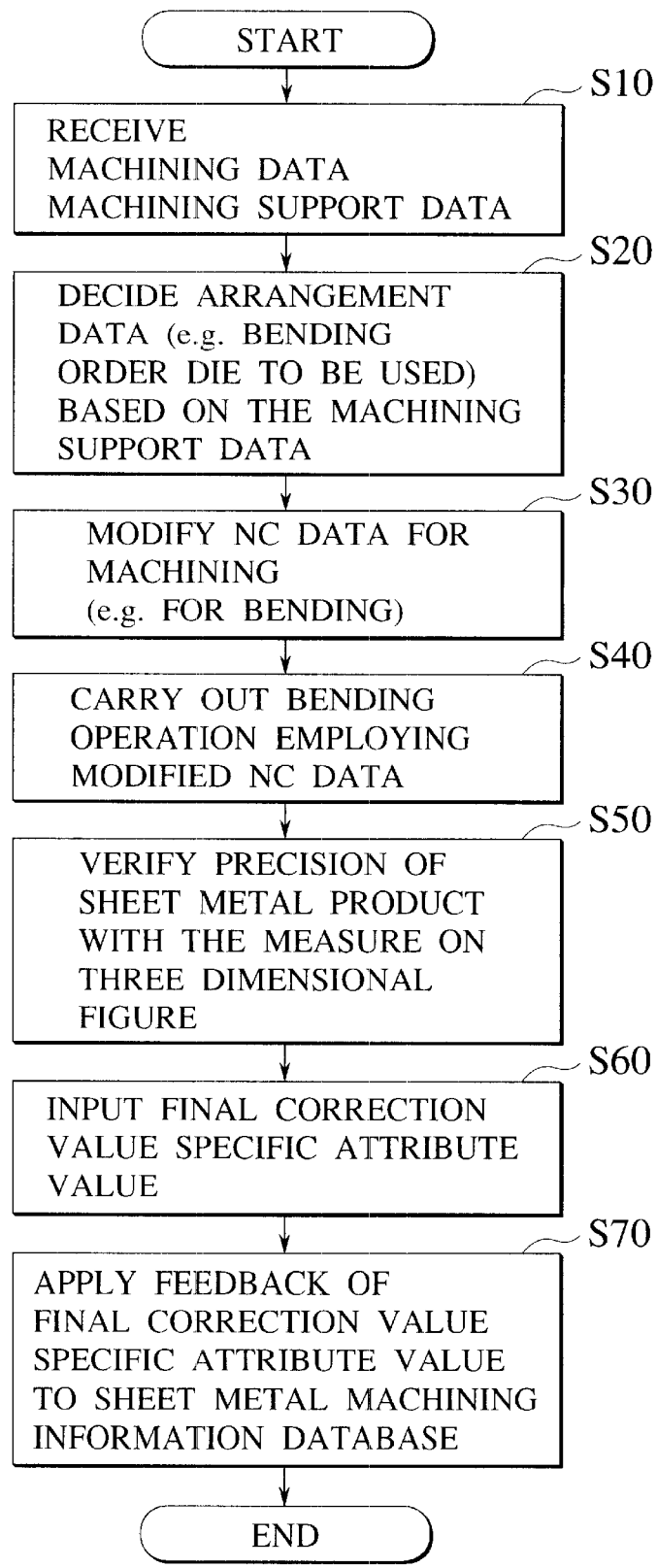
FIG. 6 is a flow chart illustrating algorithm the in the actual machining data collecting component of the embodiment of the invention.

Now, the processing operation for a bending process will be described by referring to FIG. 6.

When a new sheet metal product is to be processed in the bending process, appropriate positional data (e.g., L-value, D-value) on the die and the work (blank) have to be selected by taking the stretch value and the stroke (by which the die is pushed in) into consideration. For determining the stretch value, the wear, the warp, the spring back, the temperature, the humidity and all other attributes observable in the environment of the shop floor have to be taken into consideration.

With the embodiment, graphic data 752 and attribute data 753 relating to the NC data 720 will be read to determine the attributes to be used for the machining (S10). Then, data on the bending sequence and the selection of dies will be prepared to meet the actual machining conditions on the basis of the machining support data 750 including those on the three-dimensional figure provided with dimensional data and various other attribute data.

The NC data 720 for the bending process including the L-value and the D-value will be generated as a result of modifying the corresponding portions. At the same time, the machining attribute data 753 such as those on the dies and the bending sequence (originally stored in the site-specific attribute section 759) are also stored in the sheet metal machining information storing means 700 as additional data or as updated data. The attribute data 753 including those on the bending sequence and the dies selected as optimal in the machining simulation in the design phase are arranged to correspond to the machining data 720. Thus, the machining data 720 can be confirmed on the shop floor with ease by retrieving them with the corresponding machining support data 750 by means of the control terminal and displaying them on the multi-window along with the three-dimensional figure provided with appropriate attributes. If defective development (a state where a sheet metal product having a desired profile cannot be obtained) is found at this time as a result of verification particularly in terms of die attributes, material attributes, machine attributes, machining attributes and environment attributes, then the corresponding ones of the NC data 720 will be corrected (S40). At the same time, the corrected data will be fed back correspondingly for the NC data 720, the graphic data 752 and the attribute data 753 in the sheet metal machining information storing means 700.

Then, at the stage of bending operation, arrangements are made for selecting machines and dies to be used and for centering prior to actual machining. Thereafter, the blank is subjected to a bending operation under the control of the NC data for bending (S40) to produce a desired sheet metal product.

Finally, the produced sheet metal product is subjected to a final acceptance test by referring to the data on the important dimensions and angles in the three-dimensional figure data of the machining support data 750 (S50). Thus, the operator can easily check if the product shows the required level of precision.

At this stage of operation, the definite NC data 720 used for the operation, the corrected final NC data, the site-specific attribute data obtained by the machining operation and the data obtained actual measurements are collected by the actual machining data collecting component 600 (S60). These site-specific attribute data and the actual measurement data are stored in the appropriate storage areas for machining data 720 and machining support data 750 in the sheet metal machining information storing means 700 as additional data or as updated data. These data maybe collected automatically on a one by one basis when each of them is obtained or only optimal ones of them may be selectively collected according to the judgment of the operator.

The above described machining simulation in the design phase can be carried out at an appropriate location such as the display screen of the control terminal connected to the machine or the large monitor screen that may be provided on the operation panel. As a result, the development elevation data and the three faces design drawing data can be verified by comparing them with each other prior to actual machining and the blank and the development elevation data provided with attribute data can also be verified on the machining site after the NCT/laser machining operation. If any defect is found on the profile or on the arrangement in the development elevation as a result of the machining simulation at this stage of operation, the corrected data are fed back to correct the NC data 720, the graphic data 752 and/or the attribute data 756, whichever appropriate. It may be needless to say that the machining simulation on the machining site can be conducted also for the bending process.

The machining data 720 used at the actual machining stage and the machining support data 750 including various attribute data relating to the machining data are stored in the sheet metal machining information database 700 so that they may be accessed from any terminals. Thus, the machine tools to be used in different machining steps can be connected with each other by way of a network so that the overall machining operation can be carried out highly accurately and quickly by cross referencing the attribute data stored in different locations. For example, the precise positional data of the punch to be used in the NCT process can be determined by using the stretch value obtained in the bending process.

The effect of the invention is not limited to the NCT/laser machining process and the bending process. For instance, a welding process can also be carried out highly accurately and quickly by utilizing the obtained attribute data.

If there is an order for a product identical with (hereinafter referred to as repeater) or similar to (hereinafter referred to as similar) a past product, the corresponding machining support data 750 can be utilized, using the type ID 757 as key. The utilization of accumulated machining support data 750 makes it very easy or unnecessary to prepare a development elevation as brain development and select arrangement data for the bending order and the die selection and improves the rate of operation of the machine tools. In other words, in the case of a repeater, the machining process can be conducted almost automatically by utilizing the accumulated site-specific attribute data 759 obtained on the basis of the know how of skilled operators on the site and the intra-arrangement time required for verification can be reduced to almost nil.

If the product to be machined is a repeater or not can be determined instantaneously by reading the bar code on the letter of instruction. If it is a repeater, the sheet metal machining data relating to it will be automatically transferred and loaded for actual machining.

The CAE equipment 10, the server 20, the control terminals 30, 40, 50, 60 connected by a network, some of which are located on the design site A while the rest are on the machining site B, can be used not only for design or machining operations but also to freely retrieve necessary data from the sheet metal machining information storing means 700 by way of the sheet metal machining data searching module 5 by specifying a selected key. This flexible data retrieval function makes it possible to acquire necessary machining data 720 and various machining support data 750 on a real time basis at any time. Additionally, the data retrieval function also makes it possible to acquire machining data 720 and machining support data 750 not only for the sheet metal product to be machined but also for similars and repeaters.

Above described machining simulations can be reproduced on the monitor screen of the operation ppanel on the machining site. Reproduced simulations make it easy to double check the machining data 720 and the machining support data 750 on both the design site A and the machining site B to further improve the machining accuracy.

Now, the function of automatically correcting the NC data of a machining process as final data will be described by way of an embodiment obtained by modifying the above embodiment and by referring to the flow chart of FIG. 11.

The step of receiving data from the server unit and that of determining the bending order and selecting the die to be used (S210 and S220 in FIG. 11) are similar to S10 and S20 (FIG. 6) of the above embodiment.

Figure 12A:
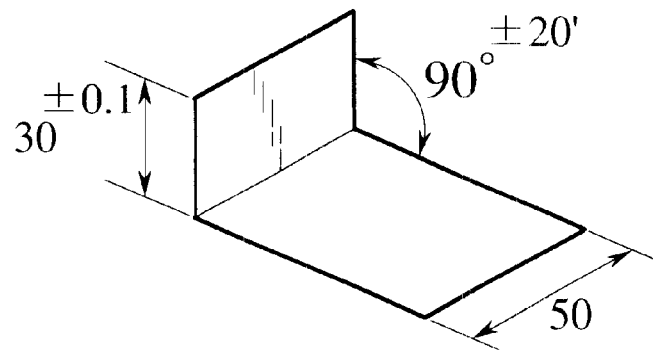
FIGS. 12A and 12B are schematic illustrations showing perspective views of a work test piece in different machining steps performed by using a modified embodiment of the invention.
Figure 12B:
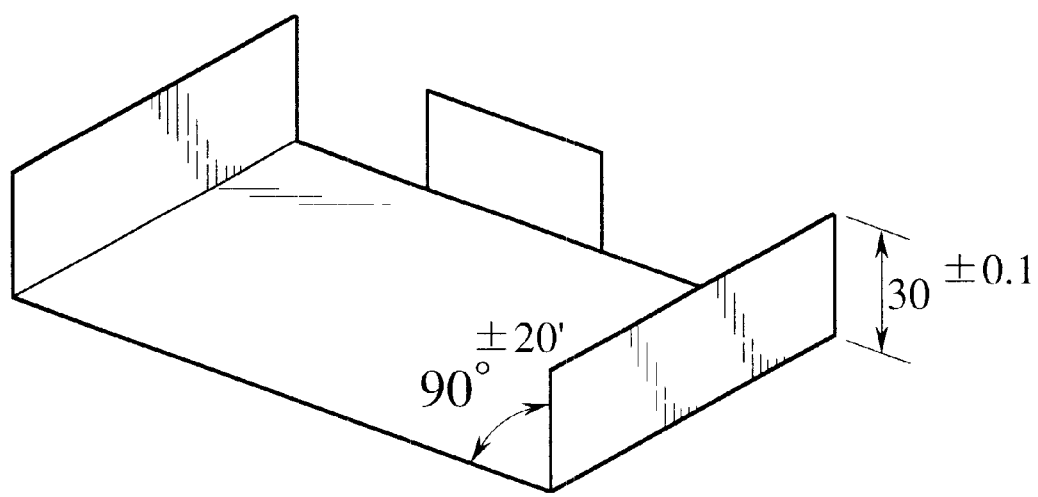

With this modified embodiment, a test machining operation is performed on a test piece made of a material and having a thickness same as the blank to be machined (S230). Then, the actually measured data on the dimensions and the angles of the test peace are automatically collected (S240). Then, the obtained data and the corresponding data for the dimensions and the angles stored as machining data are compared and differences are obtained by computation (S250). The machining data 720 and the machining support data 750 are then automatically corrected on the basis of the differences. The actual bending process is conducted by using the corrected machining data (S260). As shown in FIG. 12, the test piece may be a blank (FIG. 12-(A)) that is only equal to part of the blank (FIG. 12-(B)) to be machined if they have significant dimensions and angles in common. Additionally, the three-dimensional figure of the test piece and that of the blank may be displayed with importation dimensions and angles. The sheet metal product is checked and the corrective values are fed back to the sheet metal machining information storing means 700 as S60 and S70 (FIG. 6) in the case of the above embodiment (S270, S280 in FIG. 11).

With the above described function, the blank can be actually machined, using NC data corrected to reflect the environment of the shop floor. Thus, this function is particularly useful for the machining process of a product for which no site-specific attribute data are available.

As discussed above, with this embodiment, machining data including corrected final values and site-specific attribute data are collected and stored in the sheet metal machining information storing means 700. The accumulated data are centrally controlled in an organized manner particularly in terms of corrected final values and site-specific attribute data. With this function, the know how of skilled operators on the machining site can be effectively fed back to the design phase.

Additionally, with this embodiment, simulations will be conducted for the profile to be produced by machining and the machining arrangement (machining sequence) prior to actual machining, using highly accurate machining support data reflecting the environment of the shop floor. This second function makes it possible to generate NC data on the basis of the flawless development elevation data verified on the CAE equipment and carry out a series of machining operations including NCT/laser machining and bending on the basis of the correct NC data. Thus, any defective development elevation will be eliminated.

Still additionally, finalized data reflecting the know how of skilled operators on the shop floor are fed back to the sheet metal machining information database after the actual machining process. In other words, highly accurate machining data and machining support data that are not comparable with estimated data will be accumulated. The accumulated sheet metal machining data inductively improve the accuracy of data to make it possible to automatically collect highly accurate machining data and machining support data. Thus, the skill and the know how of skilled operators can be handed down to less skilled operators who share and utilize the accumulated sheet metal machining data so that the latter can also perform their missions easily and reliably. The system of sharing and reutilizing the accumulated sheet metal machining data can prevent preparation of identical or similar machining data at different sites so as to eliminate any intra-arrangement operation required for verification and test piece machining that takes a considerable part of the overall intra-arrangement and to cancel a bottle neck in the conventional sheet metal machining practice.

Still additionally, with the above embodiment, different machining steps on the machining site can communicate with each other two-directionally by way of a network. The actual machining site and the design site can also communicate with each other two-directionally. This third function organizes and mutually connects the machine tools on the shop floor, as that the machining support data of the machine tools are cross-referenced and their accuracy is improved. Consequently, the rate of operation of the machine tools will be remarkably improved.

Finally, the verifying operation and the operation of making arrangements can be carried out and confirmed easily by referring to the machining support data displayed on the display screen. Thus, the dependency of the verifying operation and the operation of making arrangements on skilled operators is eliminated and these operations can be carried out by any operators regardless of the level of skill. Consequently, again the rate of operation of the machine tools will be remarkably improved and the machining line may be driven automatically 24 hours per day and 365 days per year.

In summary, an integrated support system for supporting sheet metal machining according to the invention provides a function of collecting and accumulating finalized data that reflect the know how of skilled operators on the shop floor acquired in actual machining operations. As the data are fed back to and accumulated for the design phase, the skills of skilled operators will be handed down to unskilled operators so that the accuracy of sheet metal machining can be inductively improved on the basis of the know how of skilled operators on the shop floor. The data obtained through different machine tools can be mutually utilized to improve the rate of operation of the machine tools.

Additionally, an integrated support system for supporting sheet metal machining according to the invention provides a function of virtual simulation, using machining data (verification of the development elevation) and machining support data (arrangement data), that can be conducted on the design site prior to actual machining. This function of virtual simulation shifts the intra-arrangement operation on the machining site (shop floor) to the extra-arrangement operation on the design site (office) to realize actual machining on the basis of highly accurate machining data. Thus, the work load of the operators is reduced and the rate of operation of the machine tools are improved.

Finally, an integrated support system for supporting sheet metal machining according to the invention provides a function of forming a database of machining data and machining support data that can be retrieved and displayed on the displays connected by a network. This retrieval/display function allows the design personnel to design at terminals connected by a network by referring to the attribute data that are different for each machine tool and the operators on the floor to carry out machining operations according to an image of the finished product.

Thus, according to the invention, the rate of operation of machine tools can be improved and defective sheet metal products can be eliminated to improve the quality of finished products. Then, the overall productivity is improved by the reduced cost of manufacturing sheet metal products and the reduced turn around time. Therefore, the present invention makes it possible to provide sheet metal products excellently competitive in the market to raise the profit of the supplier.

Various modifications will become possible for those skilled in the art after receiving the teachings of the present disclosure without departing from the scope thereof. It is intended, therefore, that all matter contained in the foregoing description and in the drawings shall be interpreted as illustrated only and not as limitative of the invention.

What is claimed is:

1. An integrated support system for supporting sheet metal machining by controlling sheet metal machining information including machining information for controlling machine tools and machining support information relating to the machining information, said system comprising:

a collector that automatically collects actual machining information from the actual machining process on the machining site and site-specific attribute information on which the actual machining information are based, said collector feeds back said actual machining information and said site-specific attribute information as sheet metal machining information, said site-specific attribute information being collected on the machining site during actual machining operations so as to update reference attribute information or add thereto and said site-specific attribute information having a unique value for each machine and tool of each specific machining site, a plurality of said site-specific attribute information corresponding to one reference attribute information; and a storage that stores said sheet metal machining information.

2. An integrated support system for supporting sheet metal machining according to claim 1, wherein said actual machining information refer to corrected final values.

3. An integrated support system for supporting sheet metal machining according to claim 1, further comprising:

a design portion for generating sheet metal machining information; wherein said machining information and said machining support information accumulated as sheet metal machining information are generated by said design portion.

4. An integrated support system for supporting sheet metal machining according to claim 2, further comprising:

a design portion for generating sheet metal machining information; wherein said machining information and said machining support information accumulated as sheet metal machining information are generated by said design portion.

5. An integrated support system for supporting sheet metal machining by controlling sheet metal machining information including machining information for controlling machine tools and machining support information relating to the machining information, said system comprising:

a collector that automatically collects actual machining information for the actual machining process on the machining site and site-specific attribute information on which the actual machining information are based and feeds back as sheet metal machining information, said site-specific attribute information being collected on the machining site during actual machining operations so as to update reference attribute information or add thereto and a value of said site-specific attribute information is different for each machine and tool of each specific machining site, and a plurality of said site-specific attribute information corresponding to single reference attribute information; and a storage that stores said sheet metal machining information; wherein said machining support information include:

graphic data for the sheet metal product to be machined; and attribute data for machining providing the basis for machining data and corresponding to the graphic data.

6. An integrated support system for supporting sheet metal machining according to claim 5, wherein said attribute data consists of:

a standard attribute data section for the sheet metal product to be machined, said data being general purpose attribute data; and a site-specific data section to be used for the sheet metal product for actual machining, said site-specific attribute information being collected on the machining site during actual machining operations so as to update reference attribute information or add thereto and having a unique value for each machine and tool of each specific machining site, a plurality of said site-specific attribute information corresponding to single reference attribute information.

7. An integrated support system for supporting sheet metal machining according to claim 5, wherein said attribute data include:

material attribute data relating to a work piece to be machined;

machine attribute data relating to the machine tools to be used for machining;

die attribute data relating to the dies to be used for machining;

machining attribute data inputted during actual machining operations including at least one of stretch that appears in the actual machining, bend lines, bend angles, ridges and recesses at and around the bends of the work piece, machining sequence and used tools; and environment attribute data relating to the environmental factors apt to affect machining operations including at least one of temperature and humidity.

8. An integrated support system for supporting sheet metal machining according to claim 6, wherein said attribute data include:

material attribute data relating to a work piece to be machined;

machine attribute data relating to the machine tools to be used for machining;

die attribute data relating to the dies to be used for machining;

machining attribute data inputted during actual machining operation including at least one of stretch that appears in the actual machining, bend lines, bend angles, ridges and recesses at and around the bends of the work piece, machining sequence and used tools; and environment attribute data relating to the environmental factors apt to affect machining operations including at least one of temperature and humidity.

9. An integrated support system for supporting sheet metal machining according to claim 8, wherein said standard attribute data section includes:

material attribute data, machine attribute data and die attribute data; and said site-specific attribute data section includes:

material attribute data, machine attribute data, die attribute data, machining attribute data and environment attribute data.

10. An integrated support system for supporting sheet metal machining according to claim 5, wherein said machining support information further include:

arrangement data generated from said attribute data and relating to machining.

11. An integrated support system for supporting sheet metal machining according to claim 5, wherein said machining support information further include:

image data relating to machining.

12. An integrated support system for supporting sheet metal machining according to claim 6, further comprising:

a component that replaces said attribute data of said standard attribute data section with part or all of said attribute data of said site-specific attribute data section according to a data replacement instruction applied from outside.

13. An integrated support system for supporting sheet metal machining according to claim 5, wherein said machining support information further include:

verification data to be used for verifying the sheet metal machining data on the design site.

14. An integrated support system for supporting sheet metal machining according to claim 1, wherein said actual machining information and said site-specific attribute information are those automatically collected during a trial process of machining a test work piece conducted prior to actual machining so as to calculate correction values for correcting the machining information.

15. An integrated support system for supporting sheet metal machining according to claim 2, wherein said actual machining information and said site-specific attribute information are those automatically collected during the process of machining a test work piece conducted prior to actual machining so as to calculate correction values for correcting the machining information.

16. An integrated support system for supporting sheet metal machining according to claim 3, wherein said actual machining information and said site-specific attribute information are those automatically collected during the process of machining a test work piece conducted prior to actual machining so as to calculate correction values for correcting the machining information.

17. An integrated support system for supporting sheet metal machining according to claim 4, wherein said actual machining information and said site-specific attribute information are those automatically collected during the process of machining a test work piece conducted prior to actual machining so as to calculate correction values for correcting the machining information.

18. An integrated support system for supporting sheet metal machining according to claim 5, wherein said actual machining information and said site-specific attribute information are those automatically collected during the process of machining a test work piece conducted prior to actual machining so as to calculate correction values for correcting the machining information.

19. An integrated support system for supporting sheet metal machining according to claim 6, wherein said actual machining information and said site-specific attribute information are those automatically collected during the process of machining a test work piece conducted prior to actual machining so as to calculate correction values for correcting the machining information.

20. An integrated support system for supporting sheet metal machining according to claim 7, wherein said actual machining information and said site-specific attribute information are those automatically collected during the process of machining a test work piece conducted prior to actual machining so as to calculate correction values for correcting the machining information.

21. An integrated support system for supporting sheet metal machining according to claim 8, wherein said actual machining information and said site-specific attribute information are those automatically collected during the process of machining a test work piece conducted prior to actual machining so as to calculate correction values for correcting the machining information.

22. An integrated support system for supporting sheet metal machining according to claim 9, wherein said actual machining information and said site-specific attribute information are those automatically collected during the process of machining a test work piece conducted prior to actual machining so as to calculate correction values for correcting the machining information.

23. An integrated support system for supporting sheet metal machining according to claim 10, wherein said actual machining information and said site-specific attribute information are those automatically collected during the process of machining a test work piece conducted prior to actual machining so as to calculate correction values for correcting the machining information.

24. An integrated support system for supporting sheet metal machining according to claim 11, wherein said actual machining information and said site-specific attribute information are those automatically collected during the process of machining a test work piece conducted prior to actual machining so as to calculate correction values for correcting the machining information.

25. An integrated support system for supporting sheet metal machining according to claim 12, wherein said actual machining information and said site-specific attribute information are those automatically collected during the process of machining a test work piece conducted prior to actual machining so as to calculate correction values for correcting the machining information.

26. An integrated support system for supporting sheet metal machining according to claim 13, wherein said actual machining information and said site-specific attribute information are those automatically collected during the process of machining a test work piece conducted prior to actual machining so as to calculate correction values for correcting the machining information.

27. An integrated support system for supporting sheet metal machining comprising:

a design portion for generating sheet metal machining information including machining information for controlling machine tools prior to actually machining a sheet metal product and machining support information relating to the machining information; and a machining portion for conducting actual machining operations according to the generated sheet metal machining information;

said design portion includes:
a component that virtually verifies whether development elevation data of a product to be machined by machining and whether a machining sequence for the development elevation are correct on the design site by displaying three-dimensional figure corresponding the development elevation data according to the design data and the machining condition input for the sheet metal product to be produced by machining so as to output optimal development elevation data; wherein
said sheet metal machining information are generated after said verification according to the optimal development elevation data.

28. An integrated support system for supporting sheet metal machining according to claim 3, wherein
said design portion includes:
a verification system that virtually verifies whether development elevation data of a product to be machined by machining and whether a machining sequence for the development elevation are correct on the design site by displaying a three-dimensional figure corresponding to the development elevation data according to the design data and the machining condition input for the sheet metal product to be produced by machining so as to output optimal development elevation data; wherein
said sheet metal machining information are generated after said verification according to the optimal development elevation data.

29. An integrated support system for supporting sheet metal machining according to claim 4, wherein
said design portion includes:
a verification system that verifies a development elevation data of a product to be machined by machining and machining sequence on the design site by displaying a three-dimensional figure corresponding to the development elevation data according to the design data and the machining condition input for the sheet metal product to be produced by machining; wherein
said sheet metal machining information are generated after said verification.

30. An integrated support system for supporting sheet metal machining according to claim 27, wherein
said verification of the profile of the product to be machined is performed by verifying said input design data and the data on the finished product generated from the design data.

31. An integrated support system for supporting sheet metal machining according to claim 27, wherein
said verification of the machining sequence is performed by virtually following the actual machining sequence of the machining site forwardly and/or reversely on CAE equipment.

32. An integrated support system for supporting sheet metal machining according to claim 30, wherein
said data on the profile of the product to be machined obtained by said verification of the profile include machining attribute data providing the basis for machining information.

33. An integrated support system for supporting sheet metal machining according to claim 30, wherein
said data on the finished product include machining attribute data providing the basis for machining information.

34. An integrated support system for supporting sheet metal machining according to claim 31, wherein
said data on the finished product include machining attribute data providing the basis for machining information.

35. An integrated support system for supporting sheet metal machining comprising:
a design portion for generating sheet metal machining information including machining information for controlling machine tools prior to actually machining a sheet metal product and machining support information relating to the machining information; and
a machining portion for conducting actual machining operations according to the generated sheet metal machining information; wherein
upon receiving an input of design data and machining conditions for the sheet metal product to be machined, said design portion matches said machining conditions with attribute data identical with or similar to said machining conditions retrieved from said accumulated sheet metal machining information; and
virtually verifies whether development elevation data of the product to be machined by machining and whether a machining sequence for the development elevation are correct in advance on the design site by displaying three-dimensional figure corresponding to the development elevation data so as to output optimal development elevation data, using the sheet metal machining information corresponding to said identical with or similar to said machining conditions.

36. An integrated support system for supporting sheet metal machining comprising:
CAE equipment on a design site, said CAE equipment virtually verifying whether development elevation data of the product to be machined by machining and whether a machining sequence for the development elevation are correct by displaying a three-dimensional figure corresponding the development elevation data so as to output optimal development elevation data;
machine tools on a machining site: and
terminal units connected to the respective machine tools;
said terminal units being interconnected by a network so as to mutually communicate with each other.

37. An integrated support system for supporting sheet metal machining comprising:
CAE equipment on a design site, said CAE equipment virtually verifying whether development elevation data of the product to be machined by machining and whether a machining sequence for the development elevation are correct by displaying a three-dimensional figure corresponding to the development elevation data so as to output optimal development elevation data;
machine tools on the machining site: and
terminal units connected to the respective machine tools;
said terminal units and said CAE equipment being interconnected by a network so as to mutual communicate with each other.

38. An integrated support system for supporting sheet metal machining according to claim 36, wherein
said connections using said network include remote connections.

39. An integrated support system for supporting sheet metal machining according to claim 37, wherein
said connections using said network include remote connections.

40. An integrated support system for supporting sheet metal machining according to claim 36, wherein said mutual communication is performed by transmitting related sheet metal machining information from the sheet metal machining information database storing sheet metal machining information including machining information as control data and machining support information relating to said machining information to said machine tools.

41. An integrated support system for supporting sheet metal machining according to claim 37, wherein said mutual communication is performed by transmitting related sheet metal machining information from the sheet metal machining information database storing sheet metal machining information including machining information as control data and machining support information relating to said machining information to said machine tools.

42. An integrated support system for supporting sheet metal machining according to claim 36, further comprising:

a machining data extracting portion for extracting data including machining support information from the sheet metal machining information database storing sheet metal machining information including machining information as control data and machining support information relating to said machining information; wherein said terminal units output the extracted data.

43. An integrated support system for supporting sheet metal machining according to claim 37, further comprising:

a machining data extracting portion for extracting data including machining support information from the sheet metal machining information database storing sheet metal machining information including machining information as control data and machining support information relating to said machining information; wherein said terminal units output the extracted data.

44. An integrated support system for supporting sheet metal machining according to claim 42, wherein said machining data extracting portion extracts data including said machining support information in response to a request for retrieving sheet metal machining information corresponding to a arbitrary sheet metal product transmitted from said terminal units.

45. An integrated support system for supporting sheet metal machining according to claim 43, wherein said machining data extracting portion extracts data including said machining support information in response to a request for retrieving sheet metal machining information corresponding to a arbitrary sheet metal product transmitted from said terminal units.

46. An integrated support system for supporting sheet metal machining according to claim 36, wherein a set of one of data including machining support information constituted by at least code data, graphic data, image data and sound data in relation with machining information for controlling machine tools.

47. An integrated support system for supporting sheet metal machining according to claim 37, wherein a set of data including machining support information constituted by at least one of code data, graphic data, image data and sound data in relation with machining information for controlling machine tools.

48. An integrated support system for supporting sheet metal machining by controlling sheet metal machining information including machining information for controlling machine tools and machining support information relating to the machining information, said system comprising:

a collector that collects actual machining information for the actual machining process on the machining site and site-specific attribute information on which the actual machining information are based and feeds back as sheet metal machining information; and a storage that stores said sheet metal machining information;

wherein said machining support information includes:

a standard attribute data section having a correction flag that indicates if specific attributes are both stored and updatable; and a site-specific attribute data section updated on the machining site during actual machining operations so as to update reference attribute information or add thereto, said site-specific attribute data having a unique value for each machine and tool of each specific machining site, a plurality of said site-specific attribute data corresponding to one reference attribute data.

49. An integrated support system for supporting sheet metal machining according to claim 6, wherein only the values used to update the last machining operation are stored in the site-specific attribute data section.

50. An integrated support system for supporting sheet metal machining according to claim 6, wherein optimal attribute values retrieved from the stored values depending on the required processing speed and the available hardware are stored in the site-specific attribute data section.

* * * * *